(12) United States Patent
Sun et al.

(10) Patent No.: US 11,847,235 B2
(45) Date of Patent: *Dec. 19, 2023

(54) DATA SHARING ARCHITECTURE

(71) Applicant: Helios Data Inc., Mountain View, CA (US)

(72) Inventors: Yi Sun, San Jose, CA (US); Tao Su, Sunnyvale, CA (US); Fei Zou, Menlo Park, CA (US); Fenghua Zong, Pleasanton, CA (US)

(73) Assignee: Helios Data Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/805,601

(22) Filed: Jun. 6, 2022

(65) Prior Publication Data
US 2022/0300625 A1    Sep. 22, 2022

Related U.S. Application Data

(63) Continuation of application No. 16/747,356, filed on Jan. 20, 2020, now Pat. No. 11,354,424.
(Continued)

(51) Int. Cl.
*G06F 21/60* (2013.01)
*G06N 20/00* (2019.01)
(Continued)

(52) U.S. Cl.
CPC ........ *G06F 21/602* (2013.01); *G06F 21/6218* (2013.01); *G06N 20/00* (2019.01); *H04L 9/14* (2013.01)

(58) Field of Classification Search
CPC .. G06F 21/602; G06F 21/6218; G06F 21/554; G06F 21/566; G06F 21/6236;
(Continued)

(56) References Cited

U.S. PATENT DOCUMENTS 7,673,169 B1* 3/2010 Kumaresan ......... G06F 11/0709
714/4.4
10,581,883 B1* 3/2020 Syme .................. H04L 63/1416
(Continued)

OTHER PUBLICATIONS

International Search and Written Opinion in PCT Appl. No. PCT/US2020/013842 dated May 13, 2020, 12 pages.

*Primary Examiner* — Abiy Getachew
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to sharing data. A first computer system may receive data shared by a second computer system to permit the first computer system to perform processing of the data according to a set of policies. The first computer system may instantiate a verification environment in which to process the shared data. The first computer system may process a portion of the shared data by executing a set of processing routines to generate a result based on the shared data. The verification environment may verify whether the result is in accordance with the set of policies. The verification environment may determine whether to output the result based on the verifying and may send an indication of an outcome of the determining to the second computer system. The indication may be usable to determine whether to provide the first computer system with continued access to the shared data.

20 Claims, 8 Drawing Sheets

Related U.S. Application Data

(60) Provisional application No. 62/794,679, filed on Jan. 20, 2019.

(51) Int. Cl.
*G06F 21/62* (2013.01)
*H04L 9/14* (2006.01)

(58) Field of Classification Search
CPC ........... G06F 21/53; G06N 20/00; H04L 9/14; H04L 63/0428; H04L 63/10; H04W 12/041
See application file for complete search history.

(56) References Cited

U.S. PATENT DOCUMENTS

| | | |
|---|---|---|
| 2013/0145477 A1 | 6/2013 | Matsushima et al. |
| 2016/0080397 A1* | 3/2016 | Bacastow ............... H04L 63/10 726/1 |
| 2018/0025157 A1 | 1/2018 | Titonis et al. |

* cited by examiner

DATA SHARING ARCHITECTURE

RELATED APPLICATIONS

The present application is a continuation of U.S. application Ser. No. 16/747,356, filed Jan. 20, 2020, which claims priority to U.S. Provisional Appl. No. 62/794,679 filed Jan. 20, 2019; the disclosures of each of the above-referenced applications are incorporated by reference herein in their entireties.

BACKGROUND

Technical Field

This disclosure relates generally to sharing data between computer systems.

Description of the Related Art

Generally speaking, computer systems share information with other computer systems that may process that information in some particular manner. For example, a computer system that specializes in targeting advertisements at individuals may receive profile information from a social media platform that describes the likes and dislikes of the individuals. With increased concerns about user privacy and the ever-increasing amount of available user information, data security is becoming more and more important. Other concerns such as protecting confidential company information further escalate the importance of data security. In some situations, data may be more prone to security-based issues such as data leakage.

Figure 1A:
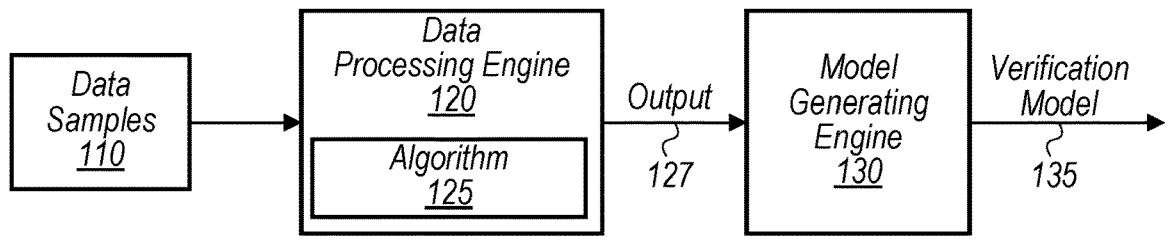
FIGS. 1A and 1B are block diagrams illustrating example elements of a setup phase that facilitates sharing among computer systems, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a data storage that has multiple data blocks, the terms "first" data block and "second" data block can be used to refer to any data block of the data storage. In other words, the first and second data blocks are not limited to the initial two data blocks of the data storage.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

One particular situation in which data is more prone to security-based issues is when data is shared between different organizations since data leakage, whether it is intentional or unintentional, happens often. Such data leakage can happen because the data provider does not have any effective tools to ensure that the data consumer is handling the data correctly (e.g., in accordance with data usage policies that are set out by the data provider). For example, a data provider cannot control what portions of the data are shared by the data consumer with other organizations. If the data consumer were to instead provide their data processing algorithm to the data provider for processing data at the data provider's system (so that the data does not have to leave the data provider's system), then the data consumer has to be concerned about potentially losing intellectual property as their data processing algorithm is exposed to the data provider. Accordingly, with limited trust between the data provider and the data consumer and with limited visibility into the algorithm being used and how the data is being used, providing data to the data consumer or providing the data processing algorithm to the data provider are both risky propositions.

The present disclosure describes techniques for implementing an architecture in which data is shared among systems in a manner that overcomes some or all of the downsides of the prior approaches. In various embodiments described below, a data provider's system provides encrypted data to a data consumer's system that processes a decrypted form of the data within a verification environment running at the data consumer's system. If an output generated based on the decrypted form complies with data usage policies defined by the data provider, then that output may be permitted to be sent outside the verification environment. In some embodiments, if the verification environment detects abnormal behavior at the data consumer's system, then the verification environment prevents subsequent processing of the data provider's data by the data consumer's system. In various embodiments, sharing data from the data provider's system to the data consumer's system occurs in two phases: a setup phase and a sharing phase.

In the setup phase, a data provider may present (e.g., by uploading at a sharing service's system) dataset information to a data consumer that describes datasets that the data provider is willing to share. If the data consumer expresses interest in some dataset, then the data provider and the data consumer may define sharing information that identifies the dataset to be shared, the algorithm(s) to be executed for processing data of that dataset, and the data usage policies that control how that data may be handled. In various embodiments, as part of the setup phase, the data provider's system may provide data samples from the dataset to the data consumer's system. The data consumer's system may then execute the algorithms (identified by the sharing information) to process the data samples in order to produce an output that corresponds to the data samples. While the algorithms are executed, input and output (I/O) operations that occur at the data consumer's system may be tracked. The output and the tracked I/O operations may then be provided back to the data provider's system for review by the data provider to ensure that they comply with the data provider's data usage policies. If the output and I/O operations are compliant, then, in various embodiments, the output, the I/O operations, the data samples, and/or the data usage policies are used by the sharing service's system to train a verification model. In some embodiments, the execution flow of the data consumer's algorithms (e.g., the order in which the algorithm's methods are called) may be tracked and used to further train the verification model. After being trained, the verification model may be used to ensure that future output from the algorithms is compliant and the data consumer's system does not exhibit any abnormal behavior (e.g., I/O operations that are not allowed by the data provider's data usage policies) with respect to the behavior that may be observed during the setup phase. In various embodiments, the data samples, the output, and the verification model are associated with the sharing information.

In the sharing phase, the data provider's system may initially encrypt blocks of data for the dataset and then may send the encrypted data to the data consumer's system for processing by the data consumer's algorithms. The data consumer's system may, in various embodiments, execute a set of software routines (which may be provided by the sharing service's system, in some cases) to instantiate a verification environment in which the data consumer's algorithms may be executed to process the data provider's data. While the data provider's data is outside of the verification environment but at the data consumer's system, it may remain encrypted; however, within the verification environment, that data may be in a decrypted form that can be processed by the data consumer's algorithms.

In some embodiments, the verification environment serves as an intermediator between the data consumer's algorithms and entities outside the verification environment. Accordingly, to process data, the algorithms executing in the verification environment may request from the verification environment blocks of the data provider's data. The verification environment may retrieve a set of blocks of the data from a local storage and a set of corresponding decryption keys from the data provider's system. The verification environment may then decrypt the set of data blocks and provide them to the algorithms for processing, which may result in an output from the algorithms. In various embodiments, before an output from the algorithms can be sent outside the verification environment, it may be verified by the verification environment using the verification model that was trained during the setup phase. If the output complies with the data usage policies (as indicated by the verification model), then the output may be written to a location outside the verification environment; otherwise, the verification environment may notify the data provider's system that abnormal behavior (e.g., the generation of the prohibited output, the performance of prohibited network and/or disk I/O operations, etc.) occurred at the data consumer's system. In some instances, if the algorithms attempt to write data to a location that is outside the verification environment by circumventing the verification environment, then the verification environment may report this abnormal behavior to the data provider's system. In response to being notified that abnormal behavior has occurred at the data consumer's system, the data provider's system may stop sending decryption keys to the data consumer's system for decrypting blocks of the data provider's data. Accordingly, the data consumer may be unable to continue processing the data.

The data sharing architecture presented in the present disclosure may be advantageous as it allows for a data consumer to process data using their own algorithms while also affording a data provider with the ability to control how that data is handled outside of the data provider's system. That is, the verification environment and the verification model may provide assurance to the data provider that their data is secured by preventing information that is non-compliant from leaving the verification environment. The data consumer may have assurance that their algorithms will not be stolen as such algorithms may not be available outside of the verification environment. Thus, the data provider may share data with the data consumer in a manner that allows the data provider to protect their data and the data consumer to protect their algorithms.

Turning now to FIG. 1A, a block diagram of various components of a setup phase 100 is shown. Such components may be implemented via hardware or a combination of hardware and software routines. In the illustrated embodiment, setup phase 100 includes data samples 110, a data processing engine 120, and a model generating engine 130. As further shown, data processing engine 120 includes an algorithm 125. In some embodiments, setup phase 100 may be implemented differently than shown, an example of which is discussed with respect to FIG. 1B.

Setup phase 100, in various embodiments, is a phase during which a data provider and a data consumer establish a framework for sharing data from the data provider's system to the data consumer's system. Accordingly, sharing information may be generated that enables that framework. In various embodiments, such information may identify a dataset to be shared, an algorithm 125 that can be used to process data in that dataset, and/or a set of data usage policies for controlling management of that data, such policies may be defined by the data provider in some cases. A verification model 135 may also be included in the sharing information and may be used to verify that the output generated by algorithm 125 complies with the set of data usage policies. In various embodiments, verification model 135 is trained based on data samples 110, outputs 127 from data processing engine 120, and the behavioral features that are observed at the data consumer's system.

Data samples 110, in various embodiments, are samples of data from a dataset that may be shared from a data provider's system to a data consumer's system. The datasets that may be shared may include various fields that store user activity information (e.g., purchases made by a user), personal information (e.g., first and last names), enterprise information (e.g., business workflows), system information (e.g., network resources), financial information (e.g., account balances), and/or other types of information. Consider an example in which a dataset identifies user personal information such as first and last names, addresses, personal preferences, Social Security numbers, etc. In such an example, a data sample 110 may specify a particular first and last name, a particular address, etc. In various embodiments, data samples 110 may be publicly available so that an entity may, for example, download those data samples and configure their algorithm 125 to process those data samples. Because the data provider may not have control over the usage of data samples 110, such data samples may include randomly generated values (or values that the data provider is not worried about being misused). In various embodiments, data samples 110 are fed into data processing engine 120. This may be done to test algorithm 125 and to assist in generating verification model 135.

Data processing engine 120, in various embodiments, generates outputs based on data shared by a data provider's system. As shown, data processing engine 120 includes algorithm 125, which may process the shared data, including data samples 110. Algorithm 125, in various embodiments, is a set of software routines (which may be written by a data consumer) that are executable to extract or derive certain information from shared data. For example, an algorithm 125 may be executed to process user profile data in order to output the preferences of users for certain products. As another example, an algorithm 125 may be used to calculate the financial status of a user based on their financial history, which may be provided by the data provider's system to the data consumer's system. While only one algorithm 125 is depicted in FIG. 1A, in various embodiments, multiple algorithms 125 may be used.

As part of setup phase 100, data samples 110 may be provided to data processing engine 120 to produce an output 127. Output 127, in various embodiments, is information that a data consumer (or, in some cases, a data provider) wishes to obtain from the data shared by the data provider's system. Output 127 may, in various cases, be the result of executing algorithm 125 on data samples 110. As explained above, the output from algorithm 125 may be verified using a verification model 135; however, in setup phase 100, output from algorithm 125 may be used to train a verification model 135. Accordingly, before verification model 135 is trained based on output 127, output 127 may be reviewed by the data provider (or another entity) to ensure that such an output is compliant with the data usage policies set out by the data provider. For example, a data provider may not want certain information such as Social Security numbers to be identifiable from output 127. Accordingly, output 127 may thus be reviewed to ensure that it does not include such information. In some cases, after an output 127 is identified to represent a valid/permissible output, it may be fed into model generating engine 130.

As explained further below, behavioral features (e.g., input and output operations) may be collected from the system executing data processing engine 120. For example, the locations to which algorithm 125 writes data may be recorded. In various embodiments, the behavioral features may be sent with output 127 to be reviewed by the data provider (or a third party). In some cases, other behavioral features such as the execution flow of algorithm 125 may not be sent to the data provider, but instead provided (without being reviewed) to the system executing model generating engine 130 for training verification model 135.

Model generating engine 130, in various embodiments, generates or trains verification models 135 that may be used to verify the output from algorithm 125. In various embodiments, verification model 135 is trained using artificial intelligence algorithms such as deep learning and/or machine learning-based algorithms that may receive output 127 and the corresponding data samples 110 as inputs. Accordingly, verification model 135 may be trained based on the association between output 127 and the corresponding data samples 110, such that verification model 135 may be used to determine whether subsequent output matches the output expected for the data used to derive the subsequent output. Verification model 135 may also be trained, based on the collected behavioral features, to detect abnormal behavior that might occur at the data consumer's system. After training, verification model 135 may be included in the sharing information and used to verify subsequent output of algorithm 125 that is based on data from the dataset being shared.

Figure 1B:
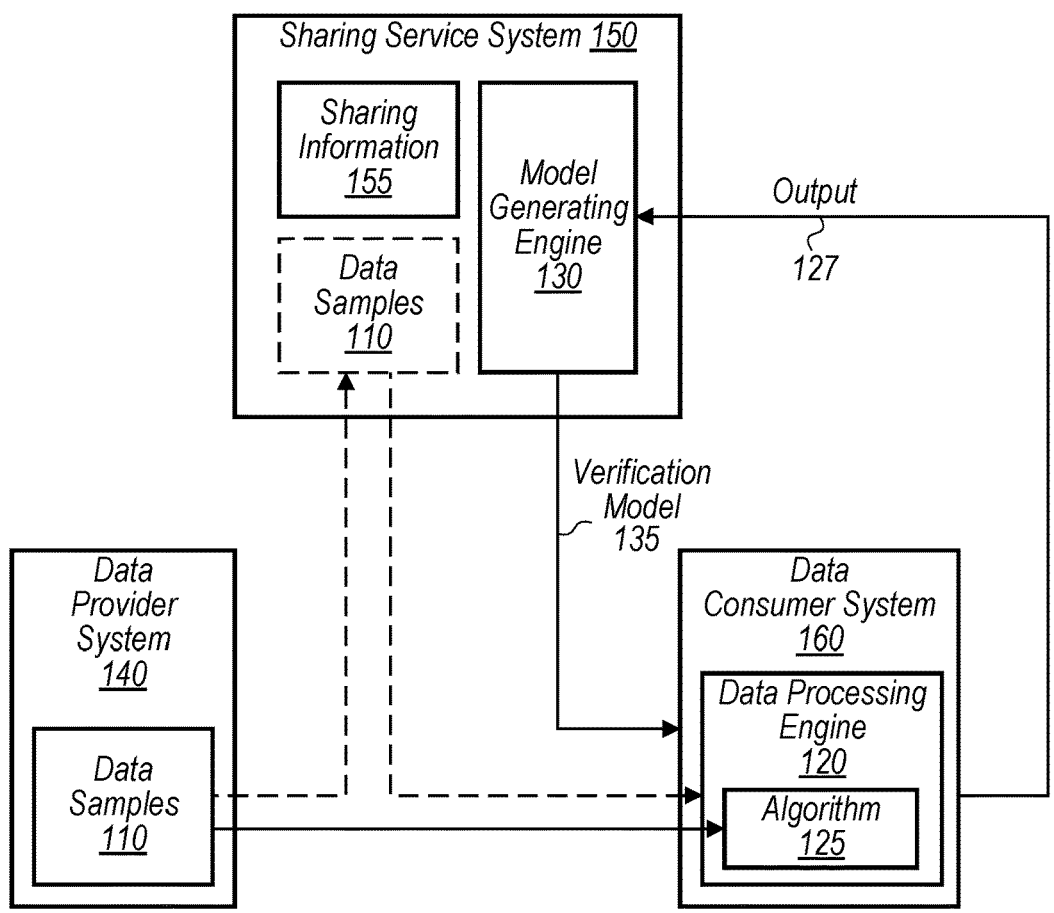

Turning now to FIG. 1B, a block diagram of various components of a setup phase 100 is shown. In the illustrated embodiment, setup phase 100 includes a data provider system 140, a sharing service system 150, and a data consumer system 160. Also as shown, data provider system 140 includes data samples 110, sharing service system 150 includes model generating engine 130 and sharing information 155, and data consumer system 160 includes data processing engine 120. In some embodiments, setup phase 100 may be implemented differently than shown. For example, sharing service system 150 may not be included in setup phase 100; instead, data sharing system 140 may include model generating engine 130.

In various embodiments such as the one illustrated in FIG. 1B, setup phase 100 involves three parties: a data provider, a data consumer, and a sharing service. The data provider refers to an entity that shares data and the data consumer refers to an entity that processes the data in some manner. The sharing service may facilitate the sharing environment between the data provider and the data consumer by at least providing mechanisms for securing the exchange of data and the managing of that data while it is outside of data provider system 140. In some embodiments, sharing service system 150 provides a secured gateway software appliance (not shown) that may be downloaded and installed at data provider system 140 and data consumer system 160 (after registering as an organization or user at sharing service system 150, in some cases). The secured gateway software appliance, in various embodiments, enables a computer system (e.g., data provider system 140 or data consumer system 160) to securely communicate with a set of other computer systems. Accordingly, the secured gateway software appliance that is installed at systems 140 and 160 may enable those systems to securely communicate information between themselves. In some cases, the set of computer systems may not identify systems (e.g., sharing service system 150) other than systems 140 and 160. Accordingly, the secured gateway software appliance that is installed at data provider system 140 may not communicate with any other system than data consumer system 160 (and vice versa). This may, in some instances, prevent the data consumer from leaking confidential information (e.g., the decryption keys) provided by the data provider. The secured gateway software appliance may further maintain sharing information 155 and may instantiate a verification environment (discussed later) in which to execute data processing engine 120.

After the secured gateway software appliance has been installed (or, in some cases, as an independent event), data provider system 140 may identify the various types of data that are stored by data provider system 140. In order to identify the various types of data, data provider system 140 may discover locations where data is maintained and build data-defined network (DDN) data structures based on the data at those locations. (Various techniques for discovering the locations where data is maintained and for building DDN data structures are discussed in greater detail in U.S. Publication No. 2019/0260787A1; the text of which is included in U.S. Provisional No. 62/794,679, which is incorporated by reference herein in its entirety). As an example, data provider system 140 may receive samples of data (e.g., personal information and financial information) from a data provider that the data provider wishes to share with a data consumer. Data provider system 140 may then use those data samples to identify locations where the same or similar data is stored. The data samples and newly located data may be used to build a DDN data structure that identifies the data and its locations. In some embodiments, data provider system 140 creates a catalog based on the DDN data structures that it built. The catalog may identify the datasets that data provider system 140 may share with a data consumer. Accordingly, data provider system 140 may share the catalog with a data consumer to allow that data consumer to choose which datasets that the data consumer wants to receive. In some embodiments, data provider system 140 publishes or uploads the catalog to sharing service system 150, which may share the catalog with a data consumer. In some instances, data provider system 140 may also publish data samples 110 for the published datasets, although data provider system 140 may, in other cases, provide data samples 110 directly to data consumer system 160 via the installed secured gateway software appliance. For example, data provider system 140 may upload the catalog that indicates that the data provider is willing to share users' financial information and may include data samples 110 of specific financial information.

When a data consumer expresses interest in a particular dataset, the data consumer and the data provider may negotiate on the details of how the data from the particular dataset may be used. This may include identifying what algorithm 125 will be used to process the data and the data usage policies that facilitate control over how the data (which may include the outputs from algorithm 125) may be used. Examples of data usage policies include, but are not limited to, policies defining the time period in which the data may be accessed, who (e.g., what users) can execute algorithm 125, disk/network I/O permissions, output format, and privacy data that is to be filtered out of outputs from algorithm 125. In some embodiments, data usage policies are expressed in a computer programming language. In various embodiments, the parties that are involved in the data sharing process, the dataset being shared, the particular algorithm 125 being used, and/or the data usage policies are defined in sharing information 155.

As part of setup phase 100, data consumer system 160 may retrieve data samples 110 from sharing service system 150 (or data provider system 140 in some embodiments) for the dataset being shared. Algorithm 125 may be customized to fit the data samples 110 (i.e., made to be able to process them) and then tested using those data samples to ensure that it can process the types of data included in the dataset being shared. In order to test algorithm 125, in various embodiments, data consumer system 160 provides data processing engine 120 to the installed secured gateway software appliance. Accordingly, the secured gateway software application may instantiate, at data consumer system 160, a verification environment (discussed in greater detail below) in which to execute data processing engine 120. Data samples 110 may then be processed by algorithm 125 to produce an output 127 that may be provided to sharing service system 150. In various cases, algorithm 125 may be tested using the approaches (discussed in FIGS. 2A-D) that are actually used in the data sharing phase (expect without a verification model 135 in various cases).

When testing algorithm 125, the secured gateway software appliance (installed at data consumer system 160) may monitor the behavior of data consumer system 160 by monitoring various activities that occur at data consumer system 160. In various cases, the secured gateway software appliance may learn the execution flow of algorithm 125. In some embodiments, for example, algorithm 125 may be run under a cluster-computing framework such as APACHE SPARK—data processing engine 120 may implement APACHE SPARK. APACHE SPARK may generate directed acyclic graphs that describe the flow of execution of algorithm 125. For example, the vertices of a directed acyclic graph may represent the resilient distributed datasets (i.e., data structures of APACHE SPARK, which are an immutable collection of objects) and the edges may represent operations (e.g., the methods defined in the program code associated with algorithms 125) to be applied on the resilient distributed datasets. Accordingly, traversing through a directed acyclic graph generated by APACHE SPARK may represent a flow through the execution of algorithm 125. In various cases, when testing algorithm 125, multiple directed acyclic graphs may be generated that may include static portions that do not change between executions and dynamic portions that do change. The secured gateway software appliance may also observe disk and network I/O operations that occur when testing algorithm 125.

Subsequent to testing algorithm 125 based on data samples 110, data consumer system 160 may generate a digital signature of algorithm 125 and output 127 from algorithm 125 (e.g., by hashing them). In various embodiments, data consumer system 160 sends output 127, the behavioral information (e.g., the directed acyclic graphs and I/O operations), and the two digital signatures to service provide system 150 to supplement sharing information 155 and to assist in training verification model 135. In some cases, output 127 and/or the information about the I/O operations may be first routed to data provider system 140 for review by the data provider to ensure that they comply with the data usage policies (which may define the acceptable I/O operations) set out by the data provider. Once output 127 and the I/O operations have been reviewed and approved, then they may be provided to sharing service system 150.

Based on data samples 110, output 127, the behavioral information, and the data usage policies specified by sharing information 155, model generating engine 130 of sharing service system 150 may generate a verification model 135. As mentioned earlier, verification model 135 may, in part, be a modeling of the input and output data (e.g., data samples 110 and output 127) that ensures that future output of algorithm 125 complies with the data usage policies. In various embodiments, verification model 135 includes a behavioral-based verification aspect and/or a data-defined verification aspect. The behavioral-based verification aspect may involve ensuring that the verification environment (discussed in more detail below) in which algorithm 125 is executed has not been compromised (e.g., the kernel has not been modified), ensuring that the execution flow of algorithm 125 is not irregular relative to the execution flow learned during setup phase 100, and ensuring that no I/O operations occur that are invalid with respect to the data usage policies defined in sharing information 155. The data-defined verification aspect may involve the removal of sensitive data fields in the data and enforcement of the output file format and output size limitations. After verification model 135 has been generated, it may be included in sharing information 155.

Thereafter, in various embodiments, sharing information 155 may be signed (e.g., using one or more cryptographic techniques) by data provider system 140 and data consumer system 160. Sharing information 155 may be maintained in the secured gateway software application at systems 140 and 160, respectively. An example data sharing phase will now be discussed.

Figure 2A:
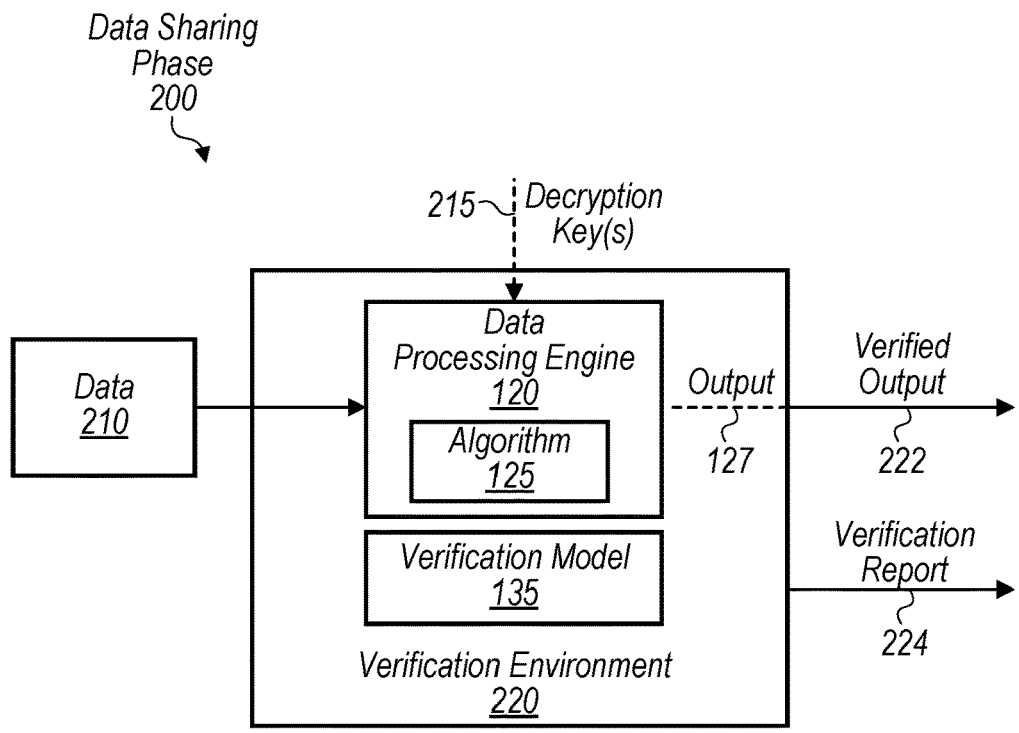
FIGS. 2A-2D are block diagrams illustrating example elements of a sharing phase where data is shared among computer systems, according to some embodiments.

Turning now to FIG. 2A, a block diagram of various components of a data sharing phase 200 is shown. In the illustrated embodiment, data sharing phase 200 includes data 210 and a verification environment 220. As further depicted, verification environment 220 includes data processing engine 120 (having algorithm 125) and verification model 135. Data sharing phase 200, in some embodiments, may be implemented differently than shown. As illustrated in FIG. 2D for example, verification environment 220 may be split across multiple systems.

Data sharing phase 200, in various embodiments, is a phase in which the data provider shares data 210 with a data consumer for processing by the data consumer's system. The data provider may progressively provide portions of data 210 to the data consumer's system or may initially provide all of data 210 to the data consumer's system before that data is subsequently processed. As an example, the data provider's system may enable the data consumer's system to process a first portion of data 210 and then may verify the output from that processing (or receive an indication that the output has been verified) before enabling the data consumer's system to process a second portion of data 210. In either case, the data provider may prevent the data consumer's system from continuing the processing of data 210 if the data provider's system determines that the data consumer has deviated from the data usage policies specified in sharing information 155.

Verification environment 220, in various embodiments, is a software wrapper routine that "wraps around" data processing engine 120 and monitors data processing engine 120 for deviations from the data usage policies (referred to as "abnormal behavior") that are specified in sharing information 155. Since verification environment 220 wraps around data processing engine 120, input/output that is directed to/from data processing engine 120 may pass through verification environment 220. Accordingly, when data processing engine 120 attempts to write an output 127 to another location, verification environment 220 may verify that output 127 to ensure compliance before allowing it to be written to the location (e.g., a storage device of the data consumer's system).

In some embodiments, verification environment 220 may be a sandbox environment in which data processing engine 120 is executed. Accordingly, verification environment 220 may restrict what actions that data processing engine 120 can perform while also controlling input and output into and out of the sandbox. In various cases, during setup phase 100, verification environment 220 may be modified/updated to support the architecture that is expected by data processing engine 120—that is, to be able to create the environment in which data processing engine 120 can even execute.

As illustrated in FIG. 2A, data 210 passes through verification environment 220 to data processing engine 120. In various embodiments, data 210 may be provided to data processing engine 120 by invoking an application programming interface of verification environment 220 that causes verification environment 220 to provide data 210 to data processing engine 120. In some cases, the interface may be invoked by data processing engine 120 itself when it wishes to process a portion or all of data 210; in other cases, the interface may be invoked by another system such as the data provider's system. In some embodiments, while data 210 is outside of the data provider's system, data 210 may be in an encrypted format to protect it. Accordingly, when sending data 210 to data processing engine 120 for processing, verification environment 220 may first decrypt the encrypted version of data 210 in order to provide a decrypted version to data processing engine 120. In order to decrypt data 210, verification environment 220 may obtain decryption keys 215 that are usable to decrypt portions of data 210 such decryption keys 215 may be provided by the data provider's system. Accordingly, this may allow the data provider to control the data consumer's access to data 210 as the data provider may continually provide keys 215 to the data consumer's system for decrypting portions of data 210 only while the data consumer's system is compliant with the data usage policies. If, for example, the data consumer's system exhibits abnormal behavior (e.g., the execution flow of algorithm 125 has changed in a significant manner, an invalid I/O operation has been performed, etc.) with respect to some portion of data 210, then the data provider's system may not provide a decryption key 215 for decrypting a subsequent portion of data 210.

Once data processing engine 120 receives a decrypted portion of data 210, the portion may be fed into algorithm 125 to produce an output 127. As mentioned above, when algorithm 125 (or data processing engine 120) attempts to write output 127 to a location outside of data processing engine 120, verification environment 220 may verify that output to ensure that that output is compliant with the data usage policies specified in sharing information 155. In some embodiments, verification environment 220 verifies an output 127 by determining whether that output falls within a certain class or matches an expected output 127 indicated by verification model 135 based on the portion of data 210 that was fed into algorithm 125. If an output 127 is compliant, verification environment 220 may write it (depicted as verified output 222) to the location requested by data processing engine 120; otherwise, that output may be discarded.

In various embodiments, verification environment 220 may also monitor the activity of the data consumer's system for abnormal behavior. For example, verification environment 220 may monitor I/O activity to determine if data processing engine 120 is attempting to write an output 127 outside of verification environment 220 without that output being verified. In cases where abnormal behavior is detected, verification environment 220 may report the behavior to the data provider's system (or another system). Accordingly, verification environment 220 may send out a verification report 224. Verification report 224, in various embodiments, identifies whether an invalid output 127 and/or abnormal behavior has been detected. In various cases, the data provider's system may decide to prevent data processing engine 120 from processing additional portions of data 210 based on verification report 224.

Figure 2B:
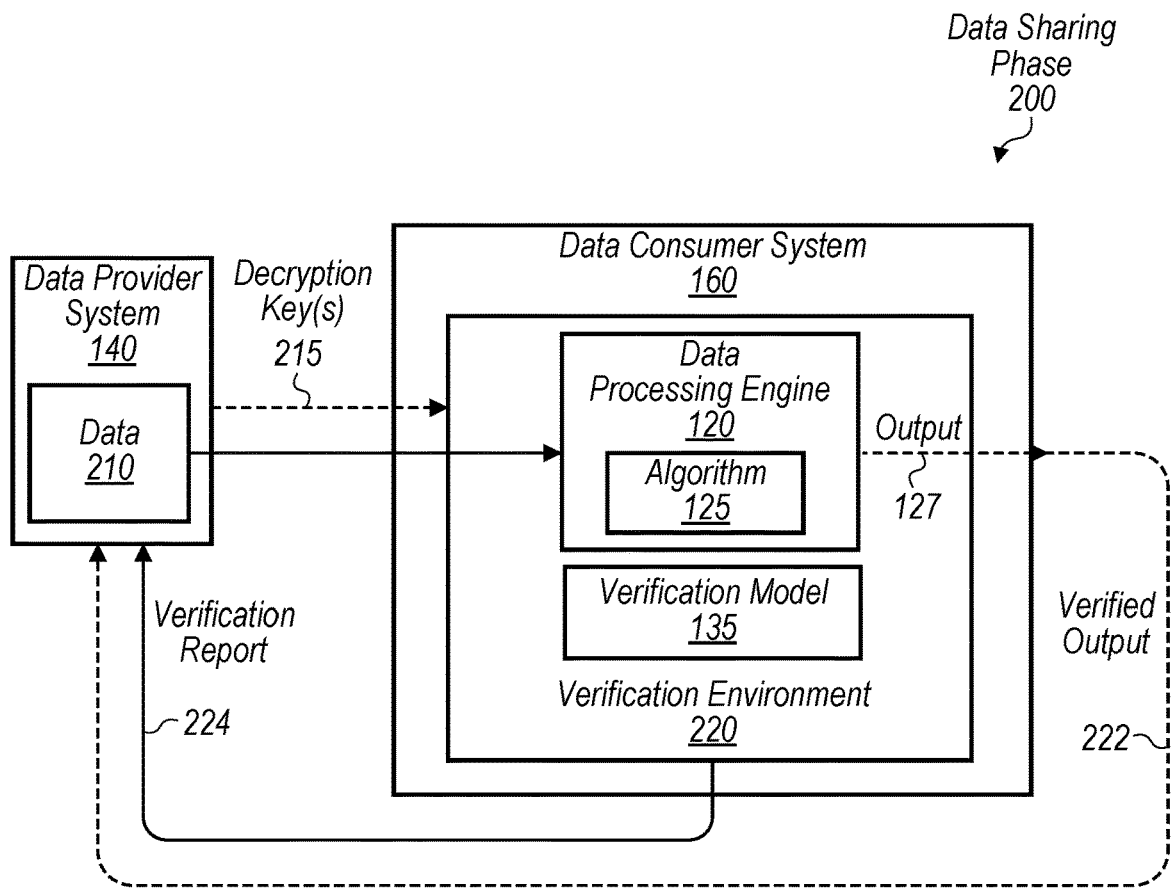

Turning now to FIG. 2B, a block diagram of various components of a data sharing phase 200 is shown. In the illustrated embodiment, data sharing phase 200 includes a data provider system 140 and a data consumer system 160. As illustrated, data provider system 140 includes data 210, and data consumer system 160 includes a verification environment 220 having a data processing engine 120 and a verification model 135. FIG. 2B illustrates an example layout of the various components discussed with respect to FIG. 2A. As shown, data provider system 140 provides data 210 and decryption keys 215 to data consumer system 160, and data consumer system 160 provides verification report 224 (and, in various cases, verified output 222) to data provider system 140.

Figure 2C:
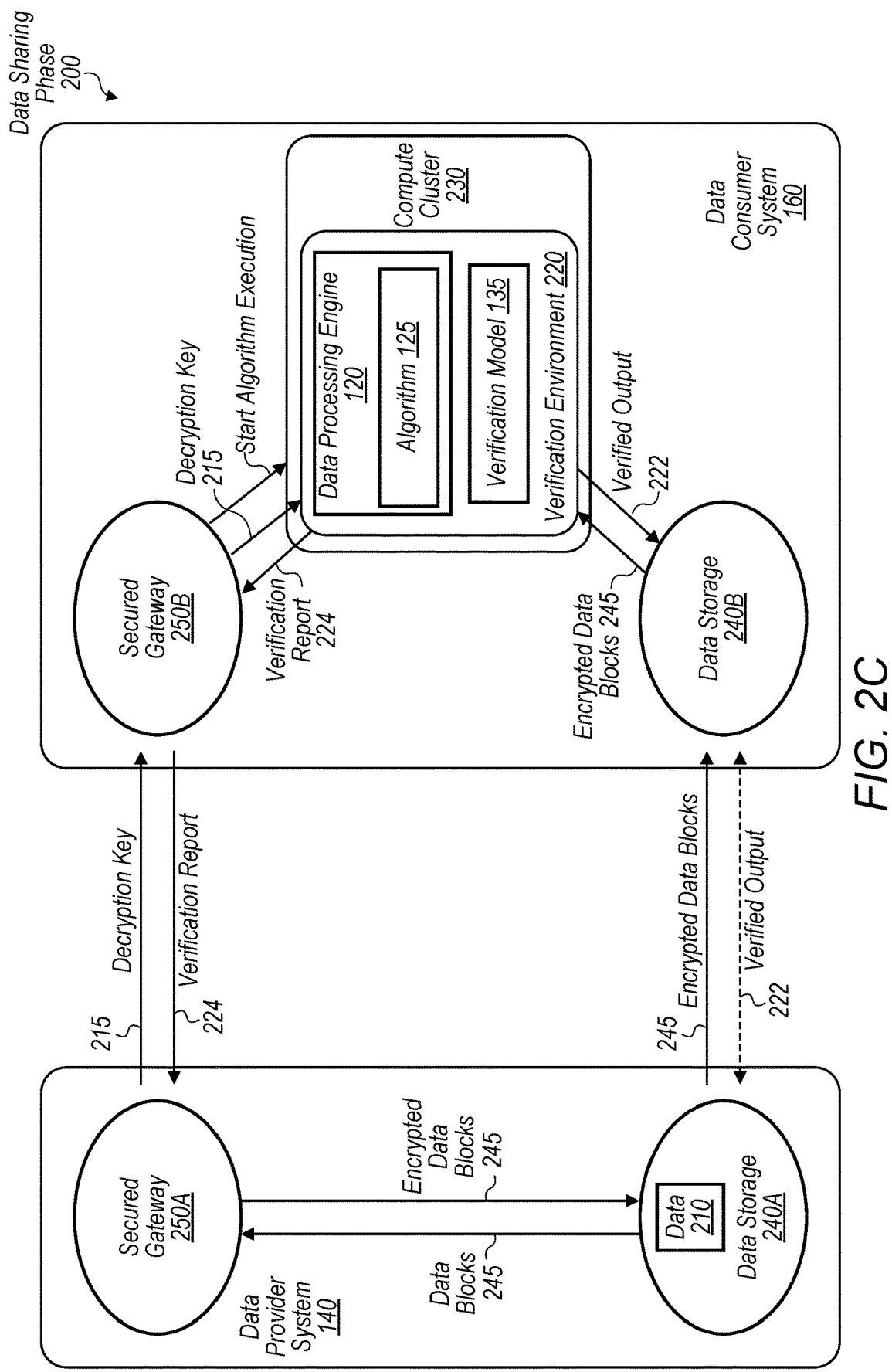
Figure 2D:
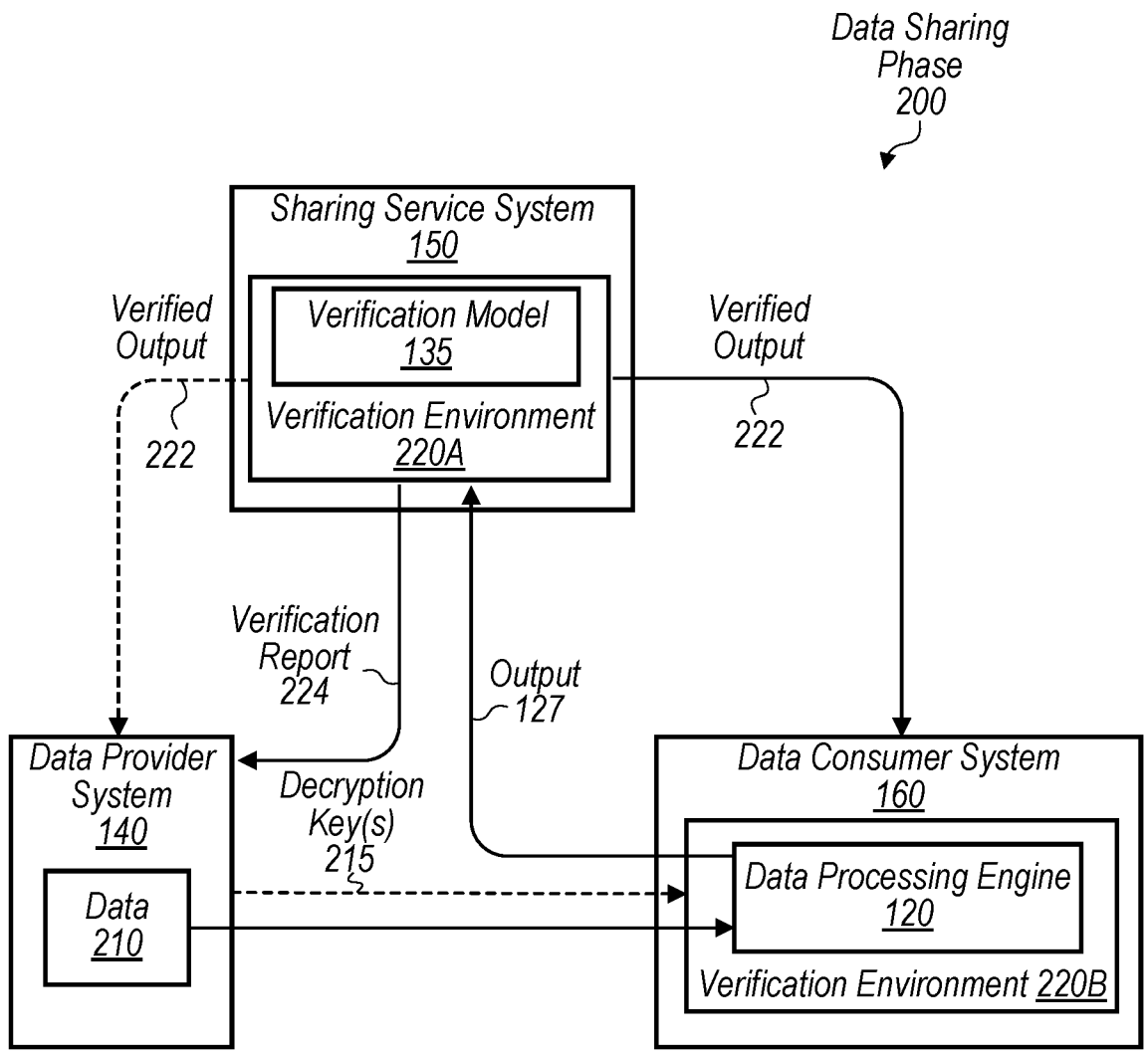

Turning now to FIG. 2C, a block diagram of various components of a data sharing phase 200 is shown. FIG. 2C illustrates another example layout of the various components discussed within the present disclosure. In the illustrated embodiment, data sharing phase 200 includes a data provider system 140 and a data consumer system 160. As illustrated, each of systems 140 and 160 includes a respective data storage 240 and a respective secured gateway 250. Also as depicted, data consumer system 160 includes a compute cluster 230 that includes a verification environment 220 having a data processing engine 120 and a verification model 135. In some embodiments, data sharing phase 200 may be implemented differently than shown, an example of which is discussed with respect to FIG. 2D.

When beginning data sharing phase 200, in various embodiments, data provider system 140 initially submits data blocks 245 of data 210 to secured gateway 250A (which, as discussed earlier, may be software routines downloaded from a sharing service system). One data block 245 may correspond to a specific number of bytes of physical storage on a storage device such as a hard disk drive. For example, each data block 245 may be 2 kilobytes in size. A file may, in some cases, comprise multiple data blocks 245. Accordingly, when sharing a given file with data consumer system 160 for processing, data provider system 140 may submit multiple data blocks 245 to secured gateway 250A. Secured gateway 250A, in various embodiments, encrypts data blocks 245 and then stores them at data storage 240A. Secured gateway 250A may create, for each data block 245, a decryption key 215 that is usable to decrypt the corresponding data block 245, such keys 215 may be sent to data consumer system 160 during a later stage of data sharing phase 200.

After the relevant data blocks 245 have been encrypted, data provider system 140 may send those data blocks to data consumer system 160, which may then store them at data storage 240B for subsequent retrieval. As mentioned earlier, data provider system 140 may build DDN data structures that identify the locations of where particular types of data (e.g., user financial information) are stored within data provider system 140. DDN data structures may, in various embodiments, store information about the history of how data is used. Accordingly, when data blocks 245 are accessed by secured gateway 250A and sent to data consumer system 160, these events may be recorded in the relevant DDN data structure and may be reviewed by a user. In various cases, while data is being shared with data consumer system 160, a DDN data structure may include policies that allow for that data to be shared. But if the data provider or a user of that data decides to not provide that data to data consumer system 160, then the policies in the DDN data structure may be removed. Accordingly, in some embodiments, if there is an attempt to send that data to data consumer system 160, enforcers that implement the DDN data structure will prevent that data from being sent to data consumer system 160 (as sending that data may be considered abnormal behavior, which is explained in greater detail in U.S. Publication No. 2019/0260787A1; the text of which is included in U.S. Provisional No. 62/794,679).

Once data consumer system 160 has begun to receive data blocks 245, data consumer system 160 may submit a request to secured gateway 250B for initiating execution of algorithm 125. Accordingly, in various embodiments, secured gateway 250B submits a request (depicted as "Start Algorithm Execution") to compute cluster 230 to instantiate verification environment 220, which (as discussed earlier) may serve as a sandbox (or other type of virtual environment) in which data processing engine 120 (and thus algorithm 125) is executed.

As explained above, verification environment 220 may provide a file access application programming interface (API) that enables algorithm 125 to access data blocks 245 by invoking the API. In response to receiving a request from algorithm 125 for accessing a set of data blocks 245, verification environment 220 may retrieve encrypted data blocks 245 from data storage 240B and may issue a key request to secured gateway 250B for the respective decryption keys 215 that are usable for decrypting those data blocks. In various cases, verification environment 220 may be limited on the number of decryption keys 215 that it may retrieve, at a given point, from secured gateway 250B. This limit may be imposed by data provider system 140 to control data consumer system 160's access to data blocks 245. As an example, in some embodiments, secured gateway 250A may provide only one decryption key 215 to secured gateway 250B before secured gateway 250B has to provide back a verification report 224 in order to receive another decryption key 215. By sending a limited number of decryption keys 215 at a time to data consumer system 160, data provider system 140 may control data consumer system 160's access to data blocks 245 so that if a problem occurs (e.g., data consumer system 160 violates a data usage policy defined in sharing information 155), then data provider system 140 may protect the rest of data blocks 245 (which may be stored in data storage 240B) by not allowing them to be decrypted. That is, data provider system 140 may not initially grant data consumer system 160 access to all the relevant encrypted data blocks 245, but instead may incrementally provide access (e.g., by incrementally supplying decryption keys 215) while the data consumer is compliant the data usage policies set out in sharing information 155. Once a decryption key 215 has been received from secured gateway 250B, verification environment 220 may decrypt the respective data block 245 and provide that data block to algorithm 125. Algorithm 125 may then process that decrypted data block (as if it were directly loaded from a data storage).

After processing one or more data blocks 245, algorithm 125 may attempt to write the output to a location outside of verification environment 220. Accordingly, algorithm 125 may invoke an API of verification environment 220 to write the output to the location. At that point, in various embodiments, verification environment 220 verifies whether the output is compliant based on verification model 135. For example, verification environment 220 may determine if the output corresponds to an expected output derived by inputting the one or more data blocks 245 into verification model 135. If compliant, then verified output 222 may be stored in a data storage (e.g., data storage 240B) of data consumer system 160. In some embodiments, output from algorithm 125 may be encrypted (e.g., by secured gateway 250B) and provided to data provider system 140 for examination. Upon passing the examination, verified output 222 may be provided back to data consumer system 160 and stored in a decrypted format. Subsequently, algorithm 125 may request additional data blocks 245, which may be provided if data consumer system 160 has not exhibited abnormal behavior. That is, data provider system 140 may not provide additional decryption keys 215 to enable additional data blocks 245 to be processed if abnormal behavior is detected.

During data sharing phase 200, verification environment 220 may monitor the behavior of data consumer system 160. If abnormal behavior (which may include invalid output, disk or network I/O operations that are not allowed by the data usage policies, etc.) is detected, such abnormal behavior may be reported to data provider system 140 in verification report 224. For example, based on verification model 135, verification environment 220 (or, in some instances, secured gateway 250B) may determine that the execution flow of algorithm 125 has deviated enough from the execution flow observed during setup phase 100—that is, the directed acyclic graphs generated for algorithm 125 during the data sharing phase 200 deviate in a significant enough manner from those generated for algorithm 125 during the setup phase 100. This type of irregularity may be reported in a verification report 224 that is sent to data provider system 140. Verification report 224 may, in some cases, be sent to data provider system 140 in response to verifying an output from algorithm 125. If data provider system 140 determines, based on a verification report 224, that abnormal behavior has occurred at data consumer system 160, then data provider system 140 may stop providing decryption keys 215 to data consumer system 160—stopping data consumer system 160 from processing subsequent data blocks 245. Otherwise, if no abnormal behavior has been detected, then data provider system 140 may send subsequent decryption keys 215 to data consumer system 160 to enable subsequent data blocks 245 to be processed. In some embodiments, verification environment 220 may terminate data processing engine 120 if abnormal behavior is detected and/or reject requests for subsequent data blocks 245.

In some embodiments, the information provided in a verification report 224 is recorded in the DDN data structure that corresponds to the data that was sent to data consumer system 160. This information may become a part of the history of how that data is used. Accordingly, a user may be able to track the progress of how the data is currently being used by reviewing the history information in the DDN data structure.

Data sharing phase 200, in some embodiments, may involve data consumer system 160 processing data 210, but not having access to verified output 222. That is, the data provider, in some instances, may wish to use the data consumer's algorithm 125 without exposing data 210 to the data consumer. Accordingly, verified output 222 may be encrypted (e.g., using keys 215 that were used to decrypt data blocks 245 for processing) and sent back to data provider system 160.

Turning now to FIG. 2D, a block diagram of various components of a data sharing phase 200 is shown. FIG. 2D illustrates another example layout of the various components discussed within the present disclosure. In the illustrated embodiment, data sharing phase 200 includes a data provider system 140, a sharing service system 150, and a data consumer system 160. As illustrated, data provider system 140 includes data 210; sharing service system 150 includes a verification environment 220A having a verification model 135; and data consumer system 160 includes a verification environment 220B having data processing engine 120.

In some embodiments, instead of output 127 from algorithm 125 being verified at data consumer system 160, output 127 may be sent to sharing service system 150 for verification by verification environment 220A. As an example, in some cases, when data processing engine 120 attempts to write output 127 from algorithm 125 to a location that is outside of verification environment 220B, then verification environment 220B may send an encrypted version of that output to verification environment 220A. Verification environment 220A may then determine whether output 127 is compliant using verification model 135. If that output is compliant, then verification environment 220A may send verified output 222 to data consumer system 160 and may send verification report 224 to data provider system 140 so that system 140 may provide subsequent decryption keys 215 to data consumer system 160. If the output is not compliant, then verification environment 220A may send verification report 224 to data provider system 140 so that system 140 may not provide subsequent decryption keys 215 and output 127 may be discarded.

Figure 3:
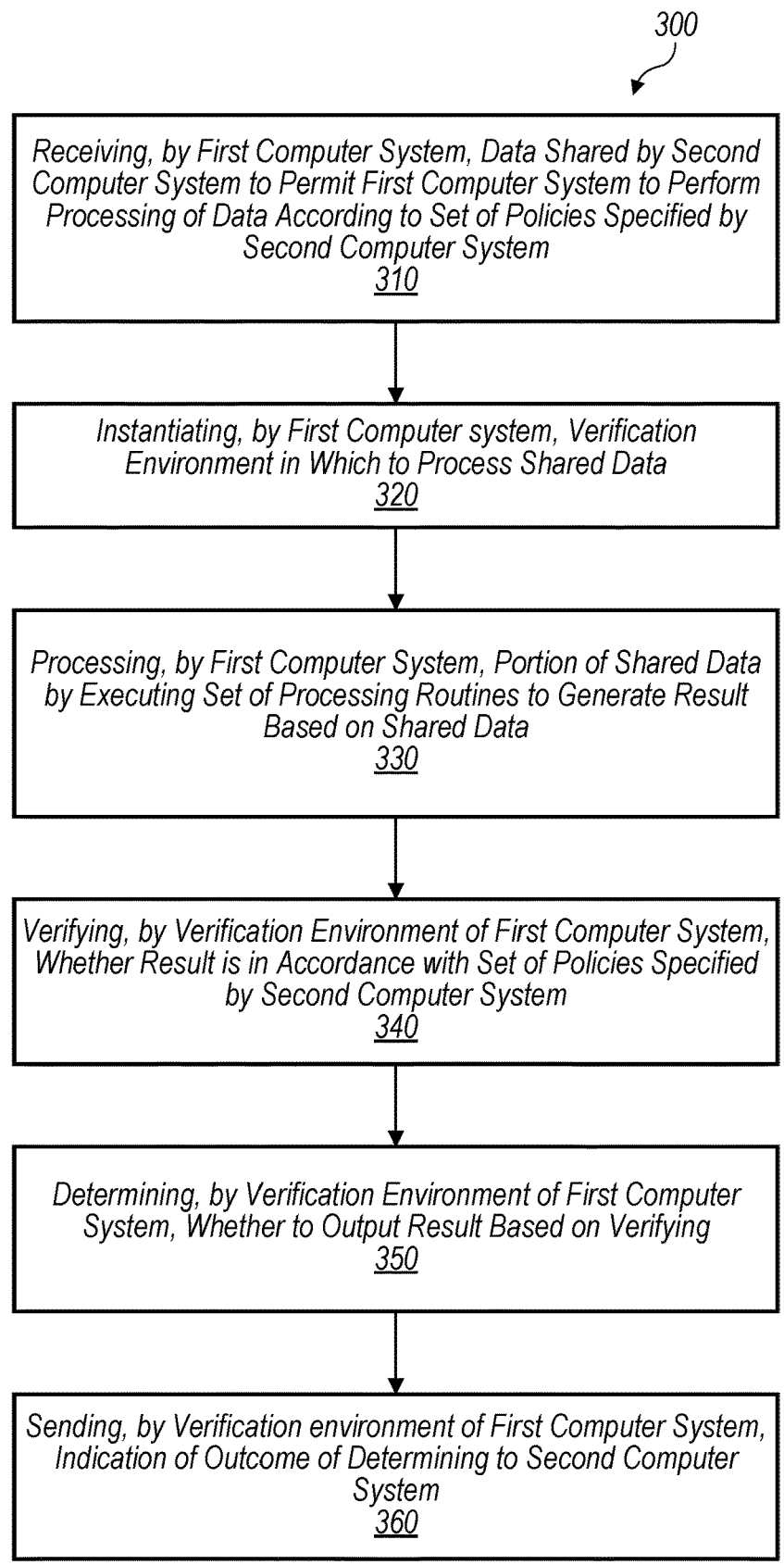
FIGS. 3 and 4 are flow diagrams illustrating example methods relating to the processing of shared data, according to some embodiments.

Turning now to FIG. 3, a flow diagram of a method 300 is shown. Method 300 is one embodiment of a method performed by a first computer system such as data consumer system 160 to process data shared by a second computer system such as data provider system 140. In some embodiments, method 300 may include additional steps. For example, the first computer system may receive, from a third computer system (e.g., sharing service system 150), a set of program instructions (e.g., program instructions that implement secured gateway 250) that are executable to instantiate a verification environment (e.g., verification environment 220) in which to process shared data.

Method 300 begins in step 310 with the first computer system receiving data (e.g., data 210, which may be received as data blocks 245) shared by a second computer system to permit the first computer system to perform processing of the data according to a set of policies (e.g., policies of sharing information 155) specified by the second computer system. The shared data may be received in an encrypted format.

In step 320, the first computer system instantiates a verification environment in which to process the shared data.

In step 330, the first computer system processes a portion of the shared data (e.g., a set of data blocks 245) by executing a set of processing routines (e.g., algorithm 125) to generate a result (e.g., output 127) based on the shared data. In some embodiments, processing a portion of the shared data includes requesting, from the verification environment by one of the set of processing routines, a set of data blocks included in the shared data and accessing, by the verification environment, a set of decryption keys (e.g., decryption keys 215) from the second computer system for decrypting the set of data blocks. Processing a portion of the shared data may also include generating, by the verification environment using the set of decryption keys, decrypted versions of the set of data blocks and processing, by ones of the set of processing routines, the decrypted versions within the verification environment.

In step 340, the verification environment of the first computer system verifies whether the result is in accordance with the set of policies specified by the second computer system. In various embodiments, the verification environment of the first computer system may determine whether the set of processing routines have exhibited abnormal behavior according to the set of policies specified by the second computer system. Such abnormal behavior may include a given one of the set of processing routines performing an input/output-based operation that is not permitted by the set of policies specified by the second computer system. In some instances, in response to determining that the set of processing routines exhibited abnormal behavior, the verification environment may terminate the set of processing routines. In some instances, in response to determining that the set of processing routines have exhibited abnormal behavior, the verification environment may reject subsequent requests by the set of processing routines for data blocks included in the shared data.

In step 350, the verification environment of the first computer system determines whether to output (e.g., as verified output 222) the result based on the verifying.

In step 360, the verification environment of the first computer system sends an indication (e.g., verification report 224) of an outcome of the determining to the second computer system. The indication may be usable by the second computer system to determine whether to provide the first computer system with continued access to the shared data (e.g., to determine whether to provide subsequent decryption keys 215).

In various embodiments, the first computer system receives an initial set of data (e.g., data samples 110) that is shared by the second computer system. The first computer system may process the initial set of data by executing the set of processing routines to generate a particular result that is based on the initial set of data. The particular result may be usable to derive a verification model (e.g., verification model 135) for verifying whether a given result generated based on the data shared by the second computer system is in accordance with the set of policies specified by the second computer system. The first computer system may provide the particular result to a third computer system, which may be is configured to derive a particular verification model based on the set of initial data, the particular result, and the set of policies. The first computer system may then receive, from the third computer system, the particular verification model. Accordingly, verifying whether the result is in accordance with the set of policies may include determining whether the result corresponds to an acceptable result that is indicated by the particular verification model based on the portion of the shared data.

Figure 4:
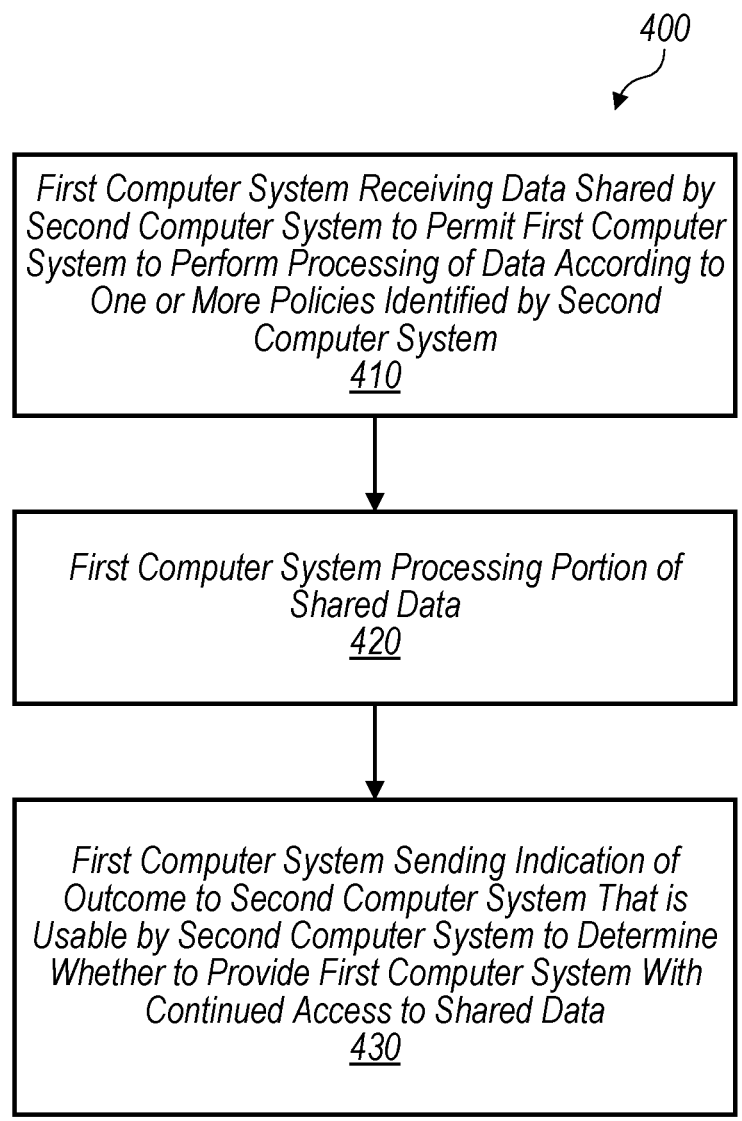

Turning now to FIG. 4, a flow diagram of a method 400 is shown. Method 400 is one embodiment of a method performed by a first computer system such as data consumer system 160 to process data shared by a second computer system such as data provider system 140. In some embodiments, method 400 may be performed by executing a set of program instructions stored on a non-transitory computer-readable medium. In some embodiments, method 300 may include additional steps. For example, the data shared by the second computer system may be in an encrypted format and thus first computer system may receive, from the second computer system, a set of decryption keys (e.g., decryption keys 215) usable to decrypt a portion of the shared data.

Method 400 begins in step 410 with the first computer system receiving data (e.g., data 210) shared by a second computer system to permit the first computer system to perform processing of the data according to one or more policies identified by the second computer system.

In step 420, the first computer system processes a portion of the shared data. In various embodiments, processing the portion includes instantiating a verification environment (e.g., verification environment 220) in which to process the portion of the shared data and causing execution of a set of processing routines (e.g., algorithm 125) in the verification environment to generate a result (e.g., output 127) based on the shared data. Processing the portion may also include verifying whether the result is in accordance with the one or more policies and determining whether to enable the result to be written outside the verification environment based on the verifying. In some embodiments, verifying whether the result is in accordance with the one or more policies may include verifying the result based on one or more machine learning-based models (e.g., verification model 135) trained based on the one or more policies and previous output (e.g., output 127 based on data samples 110) from the set of processing routines.

In step 430, the first computer system sends an indication (e.g., verification report 224) of an outcome of the determining to the second computer system. The indication may be usable by the second computer system to determine whether to provide the first computer system with continued access to the shared data. In some cases, the indication may indicate a determination to enable the result to be written outside the verification environment.

In some embodiments, the first computer system monitors the first computer system for behavior that deviates from behavior indicated by the one or more policies. In response to detecting that the first computer system has exhibited behavior that deviates from behavior indicated by the one or more policies, the first computer system may prevent the set of processing routines from processing subsequent portions of the shared data.

Figure 5:
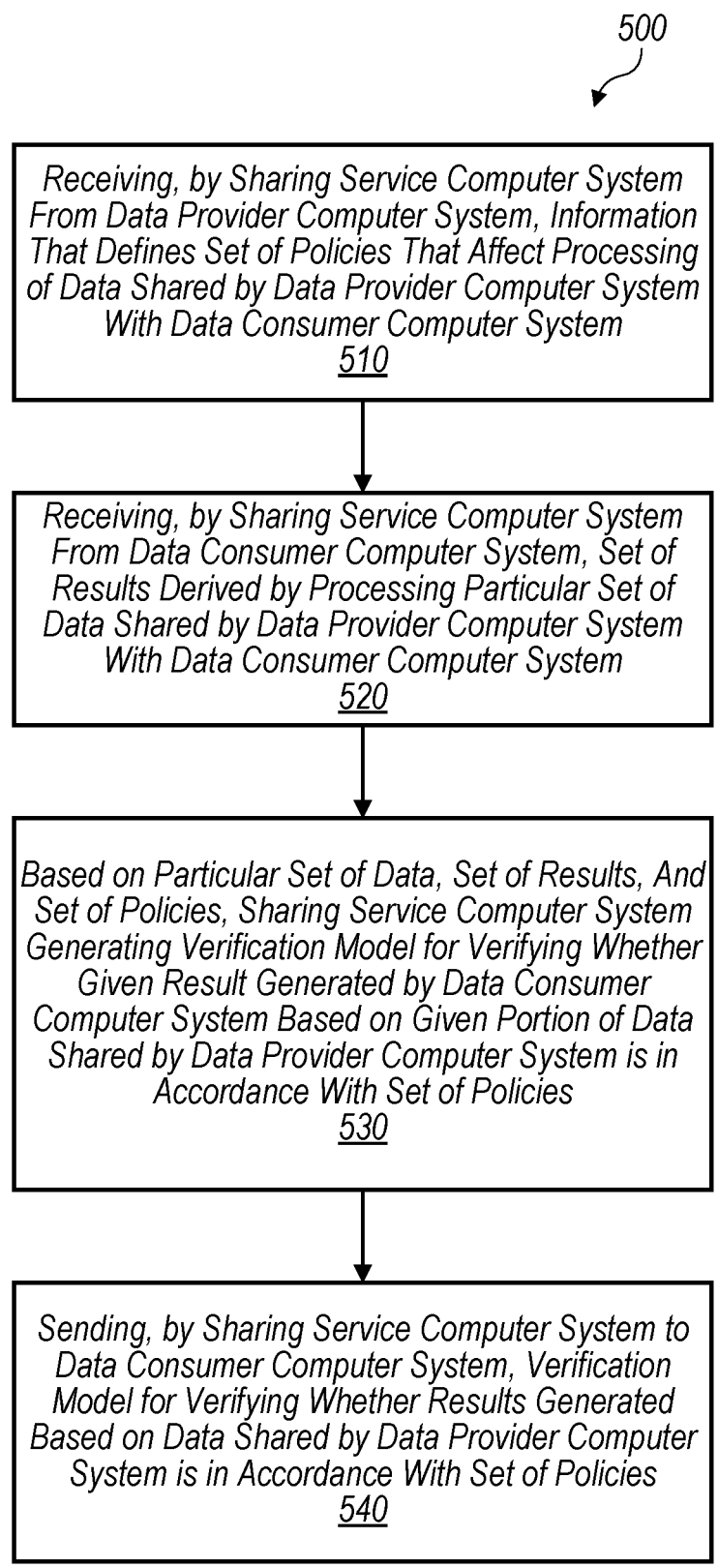
FIG. 5 is a flow diagram illustrating an example method relating to providing a verification model for verifying output, according to some embodiments.

Turning now to FIG. 5, a flow diagram of a method 500 is shown. Method 500 is one embodiment of a method performed by a sharing service computer system (e.g., sharing service system 150) to provide a verification model (e.g., verification model 135) usable to verify output from a data consumer computer system (e.g., data consumer system 160). In some embodiments, method 500 may include additional steps. For example, the sharing service computer system may send sharing information (e.g., sharing information 155) to the data consumer computer system and a data provider computer system (e.g., data provider system 140).

Method 500 begins in step 510 with the sharing service computer system receiving, from the data provider computer system, information that defines a set of policies that affect processing of data (e.g., data 210) that is shared by the data provider computer system with the data consumer computer system.

In step 520, the sharing service computer system receives, from the data consumer computer system, a set of results (e.g., output 127) derived by processing a particular set of data (e.g., data samples 110) shared by the data provider computer system with the data consumer computer system. In some embodiments, the particular set of data is shared by the data provider computer system with the data consumer computer system via the sharing service computer system. Accordingly, the sharing service computer system may receive, from the data provider computer system, the particular set of data and may send, to the data consumer computer system, the particular set of data for deriving the set of results.

In step 530, based on the particular set of data, the set of results, and the set of policies, the sharing service computer system generates a verification model for verifying whether a given result generated by the data consumer computer system based on a given portion of data shared by the data provider computer system is in accordance with the set of policies.

In step 540, the sharing service computer system sends, to the data consumer computer system, the verification model for verifying whether results generated based on data shared by the data provider computer system is in accordance with the set of policies. The sharing service computer system, in some embodiments, sends, to the data consumer computer system, a set of program instructions that are executable to instantiate a verification environment in which to process data shared by the data provider computer system with the data consumer computer system. The verification environment may be operable to prevent results generated based on data shared by the data provider computer system that are not in accordance with the set of policies from being sent outside of the verification environment. The verification environment may also be operable to monitor the data consumer computer system for abnormal behavior and to provide an indication (e.g., verification report 224) to the data provider computer system of abnormal behavior detected at the data consumer computer system.

Exemplary Computer System

Figure 6:
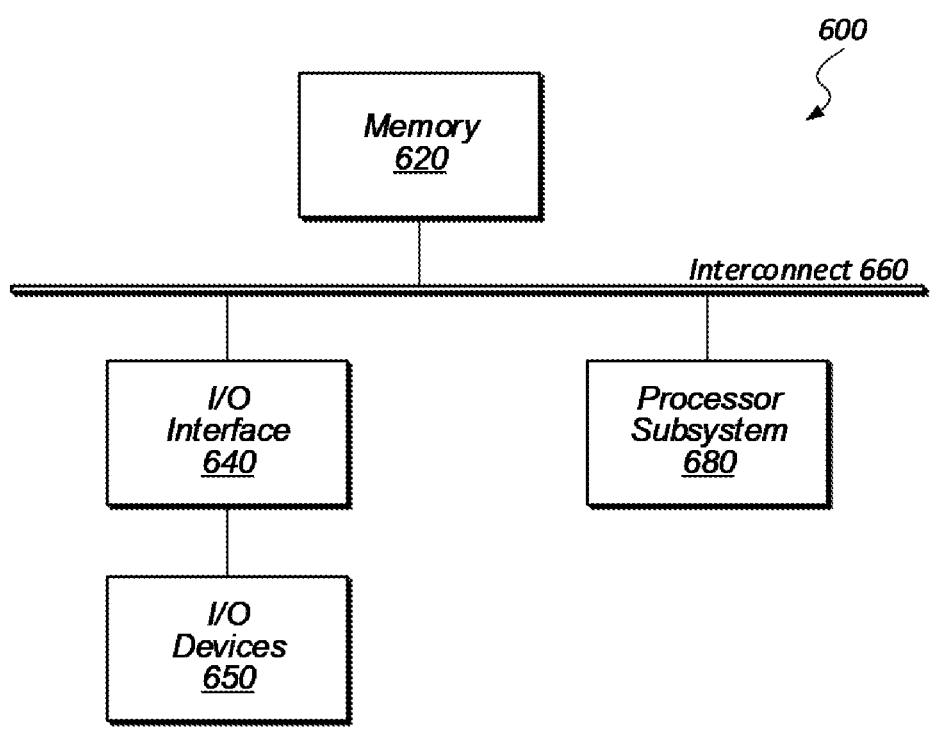
FIG. 6 is a block diagram illustrating an example computer system, according to some embodiments.

Turning now to FIG. 6, a block diagram of an exemplary computer system 600, which may implement data provider system 140, sharing service system 150, and data consumer system 160 is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Computer system 600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In some embodiments, program instructions that when executed implement data processing engine 120, algorithm 125, model generating engine 130, verification environment 220, and/or secured gateway 250 may be included/stored within system memory 620.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, by a verification environment executing on a data consumer system, shared data that is shared by a data provider system to permit the data consumer system to perform processing of the shared data according to a set of usage policies, wherein the verification environment acts as a sandbox in which processing results derived from the shared data are evaluated according to the set of usage policies before being sent outside the sandbox;

processing, by the verification environment, a portion of the shared data using a set of processing routines to generate a processing result;

detecting, by the verification environment, that the processing result is non-compliant with respect to the set of usage policies; and providing, by the verification environment and to the data provider system, a report of the non-compliant processing result, wherein the report enables the data provider system to determine whether to provide the data consumer system with continued access to the shared data.

2. The method of claim 1, wherein the shared data is received in an encrypted form, and wherein the processing of the portion of the shared data includes:

accessing a set of decryption keys provided by the data provider system; and decrypting, using the set of decryption keys, the portion of the shared data into a decrypted form to enable the set of processing routines to generate the processing result.

3. The method of claim 2, wherein the portion of the shared data includes a plurality of data blocks, each of which is associated with a respective one of the set of decryption keys.

4. The method of claim 2, wherein the data provider system is operable to prevent continued access by not sending additional decryption keys to the data consumer system to decrypt the shared data.

5. The method of claim 1, further comprising:

detecting, by the verification environment, abnormal behavior that is exhibited by the data consumer system with respect to the set of usage policies; and providing, by the verification environment and to the data provider system, a report of the abnormal behavior exhibited by the data consumer system, wherein the report enables the data provider system to determine whether to provide the data consumer system with continued access to the shared data.

6. The method of claim 5, wherein the detecting of the abnormal behavior includes:

determining that a given one of the set of processing routines has performed an input/output operation that is not permitted by the set of usage policies.

7. The method of claim 5, wherein the detecting of the abnormal behavior includes:

determining that an execution flow of the set of processing routines deviates from a prior execution flow observed in a prior execution of the set of processing routines.

8. The method of claim 5, further comprising:

terminating, by the verification environment, the set of processing routines in response to the detecting of the abnormal behavior.

9. The method of claim 1, wherein the detecting that the processing result is non-compliant includes:

verifying the processing result based on a verification model trained based on the set of usage policies and previous accepted output generated by the set of processing routines.

10. The method of claim 9, further comprising:

receiving a set of data samples that is shared by the data provider system; and processing, using the set of processing routines, the set of data samples to generate a set of processing results that is usable to derive the verification model.

11. A non-transitory computer readable medium having program instructions stored thereon that are executable by a data consumer system to implement a verification environment that performs operations comprising:

receiving shared data that is shared by a data provider system to permit the data consumer system to perform processing of the shared data according to a set of usage policies, wherein the verification environment acts as a sandbox in which processing results derived from the shared data are evaluated according to the set of usage policies before being sent outside the sandbox;

processing, within the verification environment, a portion of the shared data using a set of processing routines to generate a processing result;

detecting, based on a verification model trained based on the set of usage policies, that the processing result is non-compliant; and providing, to the data provider system, a report of the non-compliant processing result, wherein the report enables the data provider system to determine whether to provide the data consumer system with continued access to the shared data.

12. The non-transitory computer readable medium of claim 11, wherein the processing of the portion of the share data includes:

receiving, from the set of processing routines, a request for the portion of the shared data;

accessing the portion of the shared data from a local storage of the data consumer system, wherein the portion of the shared data is encrypted; and providing, to the set of processing routines, a decrypted form of the portion of the shared data to enable the set of processing routines to generate the processing result.

13. The non-transitory computer readable medium of claim 12, wherein the operations further comprise:

obtaining a set of decryption keys from the data provider system to decrypt the portion of the shared data.

14. The non-transitory computer readable medium of claim 11, wherein the operations further comprise:

detecting abnormal behavior that is exhibited by the data consumer system with respect to the set of usage policies; and based on detecting the abnormal behavior, preventing subsequent processing of the shared data by the data consumer system.

15. The non-transitory computer readable medium of claim 14, wherein the detecting of the abnormal behavior includes determining that an execution flow of the set of processing routines deviates from a prior execution flow observed in a prior execution of the set of processing routines.

16. A data consumer system, comprising:

at least one processor; and medium having program instructions stored thereon that are executable by the at least one processor to implement a verification environment that performs operations comprising:

receiving shared data that is shared by a data provider system to permit the data consumer system to perform processing of the shared data according to a set of usage policies, wherein the verification environment acts as a sandbox in which processing results derived from the shared data are evaluated according to the set of usage policies before being sent outside the sandbox;

processing a portion of the shared data using a set of processing routines to generate a processing result;

detecting that the processing result is non-compliant with respect to the set of usage policies; and providing, to the data provider system, a report of the non-compliant processing result, wherein the report enables the data provider system to determine whether to provide the data consumer system with continued access to the shared data.

17. The data consumer system of claim 16, wherein the detecting that the processing result is non-compliant with respect to the set of usage policies includes:

determining that the processing result does not correspond to an acceptable result indicated by a verification model trained based on the set of usage policies.

18. The data consumer system of claim 17, wherein the operations further comprise:

receiving a set of data samples that is shared by the data provider system; and processing, using the set of processing routines, the set of data samples to generate a set of processing results that is usable to derive the verification model.

19. The data consumer system of claim 16, wherein the operations further comprise:

detecting that a second processing result that is generated by the set of processing routines is compliant with respect to the set of usage policies; and in response to detecting that the second processing result is compliant, writing the second processing result to a location requested by the set of processing routines.

20. The data consumer system of claim 16, wherein the operations further comprise:

detecting abnormal behavior that is exhibited by the data consumer system with respect to the set of usage policies; and based on detecting the abnormal behavior, terminating the set of processing routines.

* * * * *